US010858198B1

(12) United States Patent
Good et al.

(10) Patent No.: US 10,858,198 B1
(45) Date of Patent: Dec. 8, 2020

(54) SINGULATION CONVEYOR SYSTEM WITH ROLLERS OF DIFFERENT ROLLER CROSS-SECTIONAL PROFILES

(71) Applicant: INTELLIGRATED HEADQUARTERS, LLC, Mason, OH (US)

(72) Inventors: Matthew Good, Owings Mills, MD (US); William McConnell, Owings Mills, MD (US); Darius Scott, Baltimore, MD (US); Joseph Joice, Baltimore, MD (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 16/590,822

(22) Filed: Oct. 2, 2019

(51) Int. Cl.
*B65G 43/00* (2006.01)
*B65G 13/02* (2006.01)
*B65G 47/28* (2006.01)

(52) U.S. Cl.
CPC ............. *B65G 43/00* (2013.01); *B65G 13/02* (2013.01); *B65G 47/28* (2013.01); *B65G 2203/0233* (2013.01); *B65G 2203/041* (2013.01); *B65G 2811/0673* (2013.01); *B65G 2811/095* (2013.01)

(58) Field of Classification Search
CPC ........ B65G 47/26; B65G 39/02; B65G 43/08; B65G 47/31; B65G 43/10

USPC ............................................. 198/452.02, 780
See application file for complete search history.

(56) References Cited

U.S. PATENT DOCUMENTS 6,820,736 B2 * 11/2004 Itoh ........................ B65G 39/02
198/780
8,079,462 B2 12/2011 Pelak et al.
2003/0209407 A1 11/2003 Brouwer et al.

FOREIGN PATENT DOCUMENTS

EP         1189707 A4     3/2002

* cited by examiner

*Primary Examiner* — Gene O Crawford
*Assistant Examiner* — Lester Iii Rushin
(74) *Attorney, Agent, or Firm* — Alston & Bird LLP (57) ABSTRACT

A singulation conveyor is described. The singulation conveyor includes multiple rollers, for example, a first roller and a second roller. In some example embodiments, the first roller can be of a first roller cross-sectional profile and the second roller can be of a second roller cross-sectional profile. The first roller cross-sectional profile can be defined by a sleeve mounted around a circumference of the first roller and a dowel positioned between the sleeve and the first roller. Further, in some examples, the first roller cross-sectional profile can be different from the second roller cross-sectional profile. Furthermore, according to some examples, the first roller and the second roller can be configured to be rotated based on a first rotation pattern and a second rotation pattern respectively, to cause singulation of a shingled item.

20 Claims, 6 Drawing Sheets

SINGULATION CONVEYOR SYSTEM WITH ROLLERS OF DIFFERENT ROLLER CROSS-SECTIONAL PROFILES

TECHNOLOGICAL FIELD

Example embodiments described herein relate generally to a singulation system for singulation of items (e.g. parcels) in a material handling environment, and, more particularly, to configuring a singulation conveyor with rollers of different roller cross-sectional profiles for singulating the items on the singulation conveyor.

BACKGROUND

Generally, in material handling environments like, but not limited to, distribution centers, warehouses, inventories, or shipping centers, a material handling system, can convey, handle, sort, and organize various type of items (e.g. cartons, cases, containers, shipment boxes, totes, packages, and/or the like) at high speeds. Depending on a configuration of a material handling system, the items may travel through the material handling environment in an unregulated manner (e.g., clustered, partially overlapping, substantially overlapping, and/or non-single file flow) at an initial time or may be repositioned, reoriented, and/or consolidated into a single stream of items, as the items move on conveyors. A singulator (or singulator conveyor) is an example of a conveyor that accepts an unregulated flow of items and discharges the items as a single file stream. Singulators are often wide bulk conveyors accepting inputs at various points (for example from one or more collector conveyors) and aligns the input items such that the items are discharged as a single file stream.

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein relate to a singulation conveyor. The singulation conveyor can comprise a first roller of a first roller cross-sectional profile. In some example embodiments, the first roller cross-sectional profile can be defined by a sleeve mounted around a circumference of the first roller and a dowel positioned between the sleeve and the first roller. The singulation conveyor can also comprise a second roller of a second roller cross-sectional profile. In this regard, in some examples, the second roller cross-sectional profile is different from the first roller cross-sectional profile. Further, according to some example embodiments, the second roller and the first roller can be configured to be rotated based on a first rotation pattern and a second rotation pattern, respectively, to cause singulation of a shingled item.

According to some example embodiments, the first rotation pattern and the second rotation pattern can correspond to at least one of: a rotational speed of rotation, based on which the first roller and the second roller can be configured to be rotated.

According to some example embodiments, the singulation conveyor can comprise a conveyor surface defined by a plurality of rollers mounted on the conveyor frame. In this regard, the plurality of rollers can comprise the first roller, the second roller, and a third roller of a third roller cross-sectional profile. The third roller cross-sectional profile can be different from the first roller cross-sectional profile and the second roller cross-sectional profile.

In some example embodiments, the first roller, the second roller, and the third roller can be configured to be selectively rotated based on a degree of shingling of the shingled item on the singulation conveyor.

According to some example embodiments, the plurality of rollers can comprise the first roller positioned between the second roller and the third roller and a fourth roller positioned adjacent to the third roller. In this regard, in some examples, a second surface of the second roller and a fourth surface of the fourth roller can comprise a higher coefficient of friction than a third surface of a third roller.

In some example embodiments, the second roller can be configured to rotate at a first rotational speed. Further, the fourth roller can be configured to rotate at a second rotational speed different than the first rotational speed to de-shingle the shingled item on the singulation conveyor.

According to some example embodiments, the second roller can be configured to rotate based on the second rotational pattern. Further, the fourth roller can be configured to rotate based on a fourth rotational pattern different than the second rotational pattern to de-shingle the shingled item on the singulation conveyor.

Some example embodiments described herein, relates to a singulation system. The singulation system can comprise a singulation conveyor comprising a first roller and a second roller. In this regard, in some examples, the first roller can be of a first roller cross-sectional profile and a second roller can be of a second roller cross-sectional profile. The second roller cross-sectional profile can be different from the first roller cross-sectional profile. In some examples, the first roller cross-sectional profile can be defined by a sleeve mounted around a circumference of the first roller and a dowel positioned between the sleeve and the first roller. Further, the singulation system can comprise a control unit that can be communicatively coupled to the singulation conveyor. The control unit can be configured to, identify, a first item positioned on the singulation conveyor and overlapping to a second item. Further, the control unit can be configured to cause to rotate at least one of, the first roller and the second roller based on a first rotation pattern and a second rotation pattern respectively. Rotation of the first roller based on the first rotation pattern and rotation of the second roller based on the second rotation pattern can cause separation of the first item and the second item so that the first item and the second item no longer overlap with each other.

In some example embodiments, the first rotation pattern and the second rotation pattern can correspond to at least one of: a rotational speed of rotation based on which the first roller and the second roller can be configured to be rotated.

In some example embodiments, the singulation system can further comprise a sensing unit that can be communicatively coupled to the control unit. The sensing unit can be configured to capture an image of a zone of a singulation conveyor. Further, the sensing unit can be configured to process the captured image to identify a first feature of the first item and a second feature of the second item on the singulation conveyor.

According to some example embodiments, the singulation conveyor of the singulation system can comprise a conveyor surface defined by a plurality of rollers mounted on the conveyor frame. In this regard, the plurality of rollers can comprise the first roller, the second roller, and a third roller of a third roller cross-sectional profile. The third roller cross-sectional profile can be different from the first roller cross-sectional profile and the second roller cross-sectional profile.

In some example embodiments, the first roller, the second roller, and the third roller can be configured to be selectively rotated based on a degree of shingling of the shingled item on the singulation conveyor.

According to some example embodiments, the plurality of rollers can comprise the first roller positioned between the second roller and the third roller and a fourth roller positioned adjacent to the third roller. In this regard, in some examples, a second surface of the second roller and a fourth surface of the fourth roller can comprise a higher coefficient of friction than a third surface of a third roller.

In some example embodiments, the control unit of the singulation system can be configured to cause the second roller to rotate based on the second rotational pattern and the fourth roller to rotate based on a fourth rotational pattern different than the second rotational pattern to initiate separation of the first item and the second item.

Some example embodiments described herein, relates to a method of de-shingling an item. The method can comprise identifying, an overlapping of a first item and a second item on a conveyor. In some example embodiments, the method can comprise rotating a first roller of a first roller cross-sectional profile defined by a sleeve mounted around a circumference of the first roller and a dowel positioned between the sleeve and the first roller. Further, the method can comprise rotating, a second roller of the conveyor, based on a second rotational pattern. The method can further comprise rotating, a third roller of the conveyor based on a third rotational pattern different than the second rotational pattern. In some example embodiments, the first roller can be positioned between the second roller and the third roller.

According to some example embodiments, the second rotational pattern and the third rotational pattern can correspond to at least one of: a rotational speed of rotation, based on which the first roller and the second roller can be configured to be rotated.

According to some example embodiments, a second surface of the second roller can comprise a higher friction co-efficient that the third surface of the third roller.

According to some example embodiments, the method can comprise rotating the second roller at a second rotational speed and rotating the third roller at a third rotational speed different than the second rotational speed to initiate separation of the first item and the second item.

In some example embodiments, the method can comprise rotating the second roller based on a second rotational pattern and rotating the third roller based on a third rotational pattern different than the second direction to initiate separation of the second item and the first item.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Some embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the disclosure described herein such that embodiments may comprise fewer or more components than those shown in the figures while not departing from the scope of the disclosure.

The various embodiments are described herein using the term "computing platform." The term "computing platform" can be used herein to refer to any computing device or a distributed network of computing device capable of functioning as a server, such as a master exchange server, web server, mail server, document server, or any other type of server. A computing platform may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein. In some example embodiments, the computing platform may correspond to any of, an industrial computer, a cloud computing-based platform, an external computer, a standalone computing device, and/or the like.

The term "control unit" used hereinafter the description can correspond to any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, the processing unit 116 can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. In some examples, the processing unit 116 can also exploit Nano-scale architectures such as, but not limited to, molecular and quantum-dot based transistors, switches and gates, in order to optimize space usage or enhance performance of user equipment.

The term "shingling" or "shingled items" can be used herein to refer items (for e.g., packages, parcels, cartons, totes, envelopes, paper bags, boxes, and/or the like) that may be grouped together so that a portion of one or more items of the shingled item overlaps with another portion of remaining of the one or more items. For example, the shingled items can comprise two items where a first item can be positioned over the second item so that a portion of the first item is ahead of a front edge of the first item.

The term "de-shingling items" can be used herein to refer to separating items or creating gaps between the items that can be grouped or overlapped (partially or fully) together. Accordingly, the term "de-shingled" items can be used herein to refer to items that are separated from each other or positioned at a desired gap relative to each.

The term "roller cross-sectional profile" refers to a design of the roller that may include a shape, size, structure, appearance, texture of outer/lateral surface, and/or the like of a cross-sectional surface of the roller.

Typically, on a singulation conveyor, as items come out of a bulk induction on a conveyor, the items usually are grouped or overlapped (partially or fully) over each other. One such form of item grouping is shingling, i.e. when at least a first item can be overlapping (partially or fully) over a second item. In some cases, the items may be shingled in a manner so that a front edge of the first item can be positioned ahead of a front edge of the second item. To this end, often on singulation conveyors, two or more items inducted from an induction conveyor can be grouped in such a way that one or more indicia (e.g., but not limited to, barcodes) associated with the items can be obscured and may not be detected by an imaging device installed on the singulation conveyor. Thus, in cases, the indicia on the items may not be read or scanned by an imaging device (e.g. an automated barcode reader) and it may be desired to de-shingle the items. De-shingling of the items on the singulation conveyor has associated challenges.

Various example embodiments described herein, relates to a singulation conveyor comprising a plurality of rollers that can be selectively actuated to cause de-shingling of the shingled items on the singulation conveyor. In this regard, according to various example embodiments described herein, the singulation conveyor can comprise a roller conveyor bed defined by multiple rollers of different roller cross-sectional profiles arranged in a defined order. For instance, according to some example embodiments, the singulation conveyor can have a first roller of a first roller cross-sectional profile and a second roller of a second roller cross-sectional profile. In this regard, the first cross-sectional roller profile of the first roller can be defined by a sleeve mounted around a circumference of the first roller and a dowel positioned between the sleeve and a cross-sectional surface of the roller. Further, the second cross-sectional profile of the second roller can be different from the first roller cross-sectional profile of the first roller. For instance, in some examples, the second cross-sectional profile of the second roller can be a profile defined by a rough or a brittle cross-sectional surface of the second roller (i.e. a surface that offers high frictional resistance when an item is passed over it). According to some example embodiments, the singulation conveyor can also have a third roller of a third roller cross-sectional profile. In some examples, the third roller cross-sectional profile can correspond to a profile of the roller defined by a smooth cross-sectional surface.

Further, in accordance with some example embodiments, the rollers of different cross-sectional roller profiles on the singulation conveyor can be actuated to rotate according to one or more defined rotation patterns. According to some example embodiments, for de-shingling, shingled items on the singulation conveyor, the first roller can be rotated based on a first rotation pattern and the second roller can be rotated based on a second rotation pattern. In some examples, the first roller can be rotated according to a first rotational speed and the second roller can be rotated according to a second rotational speed, to cause de-shingling of the shingled items. Further, in some example embodiments, the first roller can be rotated for a first period of time and the second roller can be rotated for a second period of time to cause separation of the shingled items.

By way of implementation of various example embodiments described herein, the rollers of the singulation conveyor allows a precise movement of items on the singulation conveyor and singulation actions can be tailored to each shingle instance, i.e. shingled items with a certain degree of shingling. Also, the different cross-sectional roller profiles of the rollers of the singulation conveyor allows varying degrees of grip (or traction) as items are passed over it, thereby allowing the rollers to manipulate and vary manipulations on the shingled items on the singulation conveyor an effective manner.

Turning now to the drawings, the detailed description set forth below in connection with the appended drawings is intended as a description of various configurations and is not intended to represent the only configurations in which the concepts described herein may be practiced. The detailed description comprises specific details for the purpose of providing a thorough understanding of various concepts with like numerals denote like components throughout the several views. However, it will be apparent to those skilled in the art that these concepts may be practiced without these specific details.

Figure 1:
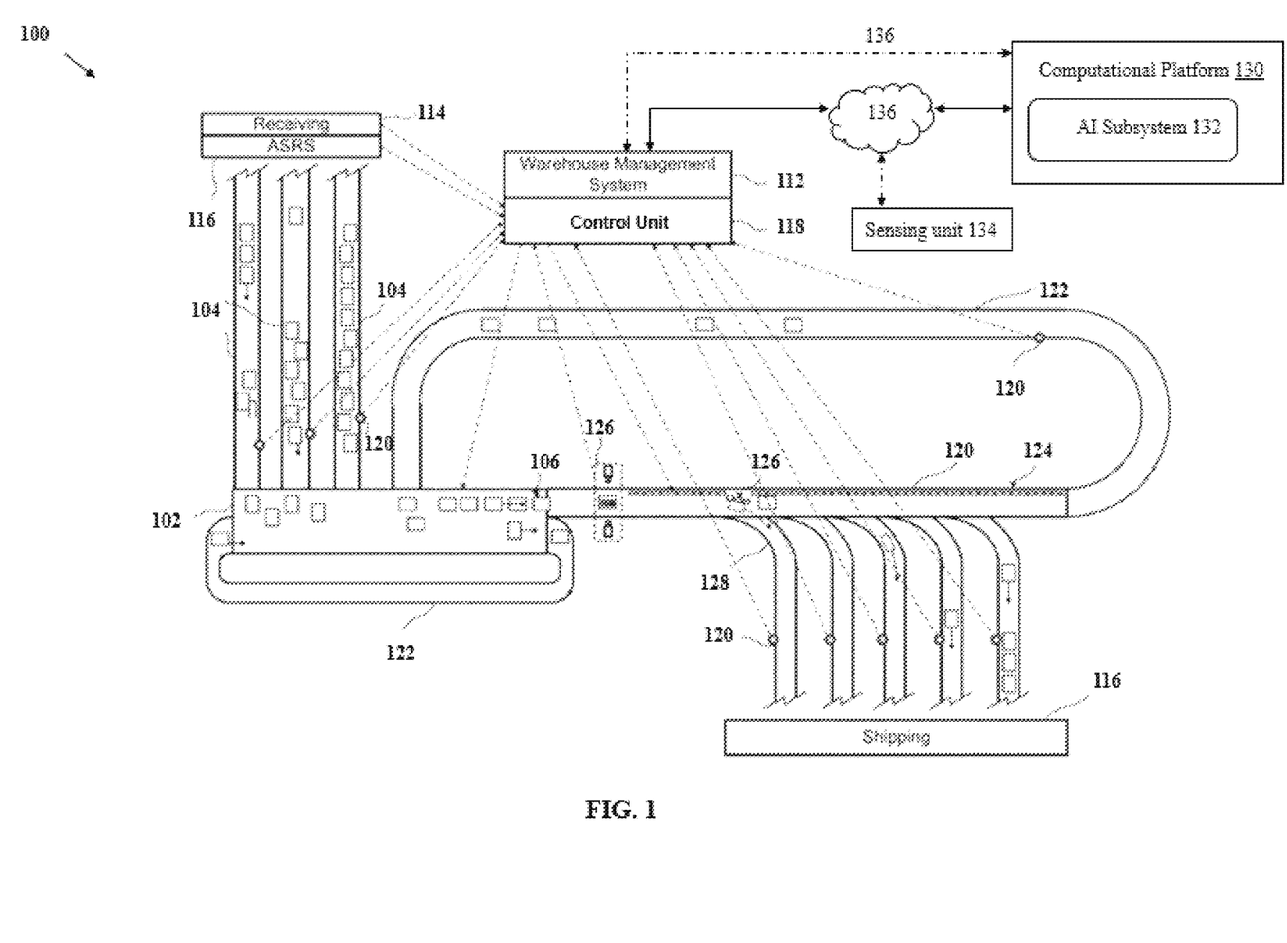
FIG. 1 illustrates a schematic view of a material handling system comprising a singulation conveyor with a plurality of rollers configured for singulation of items, in accordance with some example embodiments described herein.

FIG. 1 schematically depicts a material handling system 100 comprising a singulator conveyor 102 comprising a plurality of rollers 103 configured for singulation of items, in accordance with some example embodiments described herein. In some example embodiments, the plurality of rollers 103 can comprise rollers of different roller profiles (e.g. shape, size, structure, layout, and/or the like) that can be configured for singulation of items. In this regard, in some examples, the plurality of rollers 103 can comprise motor driven rollers (MDRs) that may be selectively actuated to cause de-shingling of shingled items.

Illustratively, the singulator conveyor 102 may receive an unregulated and/or overlapping flow of items from input conveyors 104 and output, a single stream of singulated mail, or multiple streams of singulated mail, comprising items 106 to a sortation system 108, such as a sortation system (e.g. including a linear sliding shoe sorter). In some example embodiments, the input conveyors 104, such as collector conveyors, may receive items from a presort system (not shown) and sort these items under overall control by a warehouse management system ("WMS") 112. According to said example embodiments, the WMS 112 can track items that arrive in a receiving area 114 and/or that are buffered in an Automated Storage and Retrieval System ("ASRS") 116 of a material handling environment. Additionally, the WMS 112 can track items that arrive in a shipping area 116 for shipment out of the material handling system 100. By tracking such information, the WMS 112 may generate material handling system state inputs and provide the inputs to a conveyor controller i.e. a control unit 118 based on which the control unit can control various conveyor operations, such as conveyor speeds, singulation action, mechanical actuation of one or more motor driven rollers (MDRs) of the plurality of rollers 103 etc. of various components (mechanical, electrical, etc.) in the material handling system 100.

In some example embodiments described herein, the plurality of rollers 103 of the singulation conveyor 102 may comprise multiple rollers with different roller cross-sectional profiles. Said differently, the singulation conveyor 103 can comprise rollers of multiple types, i.e. having different cross-sectional profiles, that can be arranged in a defined order. For instance, in some example embodiments, the plurality of rollers 103 can comprise a first roller of a first roller-cross sectional profile, a second roller of a second roller cross-sectional profile, and a third roller of a third roller cross-sectional profile. In this regard, the first roller cross-sectional profile, the second roller cross-sectional profile, and the third roller cross-sectional profile can be different from each other. For example, a first roller cross-sectional profile can define a smooth cross-sectional surface of the roller and the second cross-sectional roller profile can define a rough or brittle cross-sectional surface of the roller. Further, in some examples, the second roller cross-sectional profile can define a crowned or apex portion defined along a length of the roller. In this regard, according to some example embodiments, the plurality of rollers 103 of can be configured to be actuated selectively by the control unit 118 to cause separation of shingled items. Further details of cross-sectional profiles of the rollers in the plurality of rollers 103 and the actuation of the plurality of rollers 103 are described in reference to FIGS. 2-6.

According to said example embodiments, items can be directed to input conveyors 104 for release onto the singulator conveyor 102, which in turn can singulate the items into the single file stream of items 106 and can output the singulated items onto a sortation system 120. According to said example embodiments, items on the singulator 102 which may not successfully singulated into the single file stream 106 may be re-circulated back to the start of the singulator 102, via the recirculation conveyor 122. In some example embodiments, an initial portion of the sortation system 120 may be an induct conveyor operating to identify each item in the single file stream of items 106 by a scanner 126. Accordingly, in said example embodiments, the items may then pass over the sortation system 120 (e.g. a linear shoe sorter) for selective diverting by shoes 126 to destinations, depicted as take-away conveyors 128. Those items that may not be diverted may be taken by a recirculation conveyor 122 back to the singulator conveyor 102.

According to said example embodiments, the material handling system can comprise a computational platform 130 that can comprise an artificial intelligence subsystem 132. Additionally, and/or alternatively, in some examples, the control unit 118 may also comprise the AI subsystem 132. According to said example embodiments, the AI subsystem 132 can be configured to perform image processing and use artificial intelligence and/or computer vision, for identifying a shingling or a grouping of the items (i.e. a manner in which the items are overlapped over each other) on the singulation conveyor 102. In some examples, the AI subsystem 132 may be configured to identify a degree of overlapping of two or more items on the singulation conveyor 102. Further, in some examples, the AI subsystem 132 may be configured to determine any of a shape, size, color, form factor, orientation, layout, etc. of the items on the singulation conveyor 102. In some example embodiments, based on a type of shingling of the items, the control unit 118 may cause to perform, selective singulation action on the shingled items. In some example embodiments, the control unit 118 may cause to selectively actuate one or more MDRs of the plurality of rollers 103 to cause de-shingling or separation of the shingled items. Details related to arrangement of the plurality of rollers 103 and actuation of the MDRs of the plurality of the rollers 103 are described later in reference to FIGS. 2-6.

Illustratively, the material handling system 100 can also comprise a sensing system 134 comprising plurality of sensors 120, for example, one or more imaging devices, like, a color camera and/or a depth camera. In some example embodiments, the sensors 120 can correspond to, photo eyes, fullness sensors, volume sensors, speed sensors, RFID interrogators, indicia readers, and/or the like. According to said example embodiments, the sensing system 134 may additionally comprise a controller that may be configured to collect sensory data from the sensors 120 and provide the sensory data to the control unit 118.

In accordance with said example embodiments, the control unit 118, can be communicatively coupled, via a communication network 136 to the, a respective component of the material handling system 100 (for example, but not limited to, the singulator conveyor 102, the computational platform 130, the AI subsystem 132, the sensing unit 134, and/or the sortation system 120, and/or the like) to perform various operations for example, but not limited to, singulation, sortation, and/or the like. In this regard, the one or more components referred herein, may comprise a communications circuitry that may be configured to receive and/or transmit data from/to a network and/or any other device, circuitry, or module in communication over the communication network 136.

The communications circuitry referred herein, may be any means such as a device or circuitry embodied in either hardware or a combination of hardware and software associated with the respective component of the material handling system 100. In some examples, the communications circuitry may comprise a network interface for enabling communications with a wired or wireless communication network. For example, the communications circuitry may comprise one or more network interface cards, antennae, buses, switches, routers, modems, and supporting hardware and/or software, or any other device suitable for enabling communications via the communication network 136. Additionally, or alternatively, the communications circuitry may comprise the circuitry for interacting with the antenna(s) to cause transmission of signals via the antenna(s) or to handle receipt of signals received via the antenna(s). These signals may be transmitted by any of the components of the material handling system 100 and/or the control unit 118 over the communication network 136, using a number of wireless personal area network (PAN) technologies, such as, but not limited to, Bluetooth® v1.0 through v3.0, Bluetooth Low Energy (BLE), infrared wireless (e.g., IrDA), ultra-wideband (UWB), induction wireless transmission, and/or the like or via a wired communication technology, such as a data field bus, cables etc.

In some example embodiments, the control unit 118 may receive inputs, such as from the computational platform 130, and/or the WMS 112, on any of: the input conveyors 104, the recirculation conveyors 122, and/or the take-away conveyors 128. In this regard, one or more of these components of the material handling system may comprise an input/output (I/O) circuitry that may be adapted to receive one or more inputs and provide one or more outputs. In some embodiments, the I/O circuitry may, in turn, be in communication with the control unit 118 to provide output to a user and, in some embodiments, to receive an indication of user input. The I/O circuitry may comprise a user interface and may comprise a display that may comprise a web user interface, a mobile application, a client device, and/or the like. In some embodiments, the I/O circuitry may also comprise a keypad, a joystick, a touch screen, touch areas, soft keys, a microphone, a speaker, or other input/output mechanisms. In some examples, the control unit 118 and/or a user interface circuitry comprising a processor associated with the I/O circuitry may be configured to control one or more functions of one or more user interface elements associated with the I/O circuitry through computer program instructions (e.g., software and/or firmware) stored on a memory accessible to the control unit 118.

According to some example embodiments, the control unit 118 may operate the singulator conveyor 102 at variable speeds, acceleration or de-acceleration, based at least in part on sensor data received from the sensing unit 134, or other state information received from the input conveyors 104, the singulator conveyor 104, the sortation system 120, and/or take-away conveyors 128, information from the WMS 112, and/or data received from other sources. Further, the control unit 118 may selectively actuate driving belts that cause rotation of one or more of the plurality of rollers 103. In this regard, in some example embodiments, the control unit 118 may cause to rotate a first set of rollers of the plurality of rollers 103 based on a first rotation pattern (e.g. rotational speed, time period of rotation etc.) and a second set of rollers of the plurality of rollers 103 based on a second rotation pattern that can be different from the first rotation pattern. Further details of selectively actuating to rotate the plurality of rollers 103 are described in reference to FIGS. 2-6.

According to said example embodiments, the computational platform 130 and/or the control unit 118 may cause execution of instructions to cause actuation or control or movement of one or more mechanical actuators (not shown) of the material handling system 100. In some examples, the mechanical actuators may be configured to cause de-shingling or singulation of one or more items from a stream of items, positioned on the singulation conveyor 102. In some example embodiments, the control unit 118 may comprise one or more Programmable logic controllers (PLCs) that can be configured to cause execution of a planned motion path or a robotic manipulation plan of the mechanical actuators. The planned motion path or the robotic manipulation plan may be planned by any of the control unit 118 and/or the computational platform 130.

It may be understood that system set-up, i.e. the material handling system 100, as illustrated in FIG. 1 is one such exemplary environment in which the singulation conveyor 102 may be configured for operations. However, without limiting a scope of the present disclosure, in accordance with alternate example embodiments, other arrangements of components (e.g. the receiving ASRS 114, the computational platform 130, the AI subsystem 132, the sensing unit 134, and/or the sortation system 120, and/or the like) are possible where the singulation conveyor 102 can be configured for use.

Figure 2:
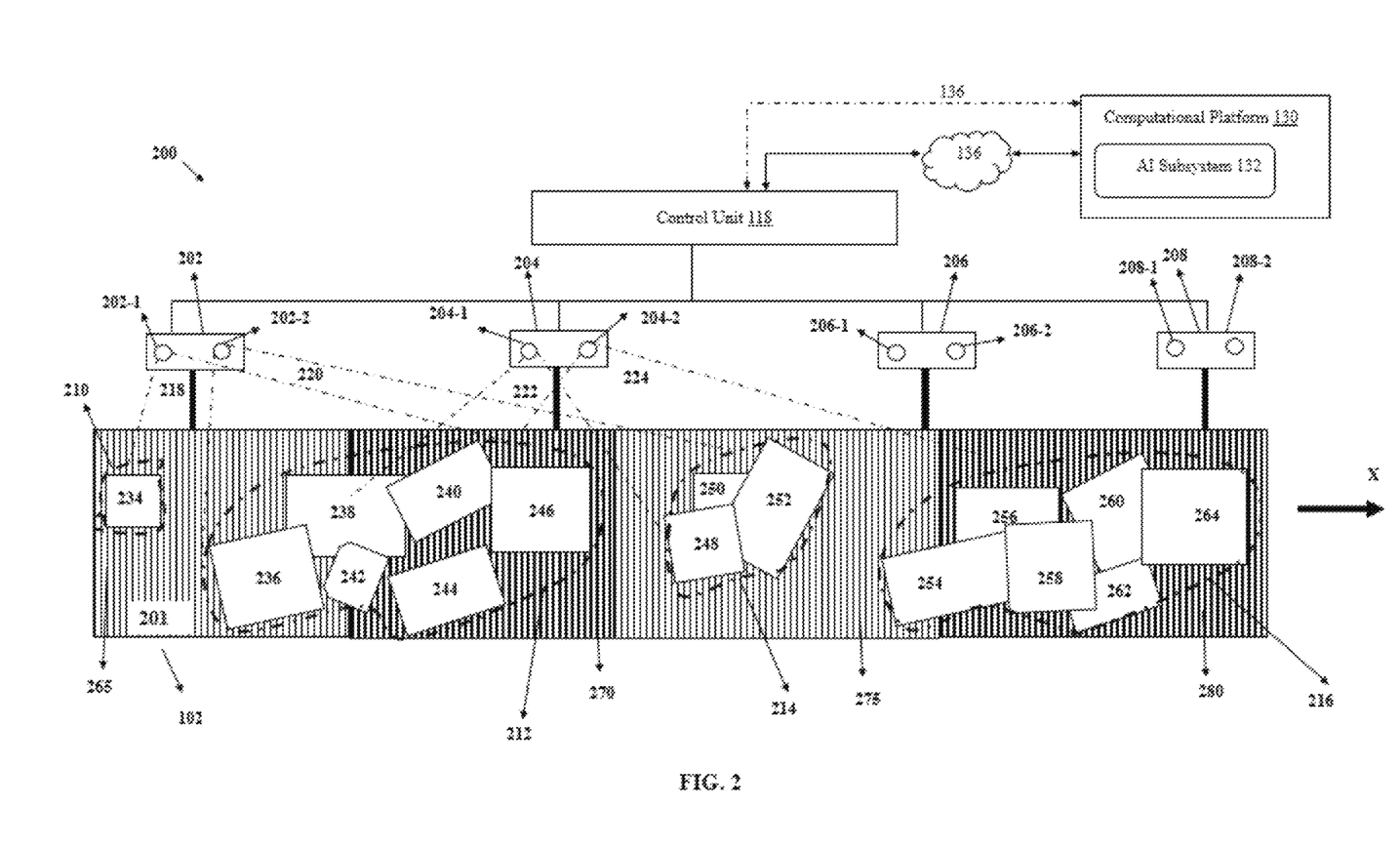
FIG. 2 schematically depicts a section of the singulation conveyor comprising a conveyor bed defined by the plurality of rollers and a plurality of zones of the conveyor bed configured to perform various singulation actions on the items, in accordance with some example embodiments described herein.

FIG. 2 schematically depicts an exemplary view 200 of the material handling system 100 comprising the AI subsystem 132 and the control unit 118 that can be configured to initiate de-shingling or separation of shingled items on the singulation conveyor 102, in accordance with some example embodiments described herein. In some example embodiments, the control unit 118 may be configured to determine, via the AI subsystem 132, information associated with the shingled items on the singulation conveyor 102. To this end, the AI subsystem 132 can be configured to determine shingled items on the singulation conveyor 102. In some example embodiments, the control unit 118 can determine information such as, a type of shingling of the items (like, but not limited to, a horizontal overlapping, a vertical overlapping, or stacking, of items) or a degree of shingling (or a degree of overlapping) of one or more items, and/or the like, on the singulation conveyor 102. Further, based on this information, according to some example embodiments, the control unit 118 can be configured to actuate one or more drive motors controlling rotation of the plurality of rollers 103 having different roller cross-sectional profiles, details of which would be described in reference to FIGS. 3-6. In this regard, the control unit 118 can cause to selectively actuate, via a respective drive motor, one or more rollers of the plurality of rollers 103 of the singulation conveyor 102 to cause de-shingling or separation of the shingled items.

As illustrated, a stream of items (234-264) can be positioned on a conveying surface 201 defined by the plurality of rollers 103 of the singulation conveyor 102. As described before, the singulation conveyor 102 can comprise the plurality of rollers 103 with different roller cross-sectional profiles. In accordance with some example embodiments, the stream of items (234-264) can move in a direction X based on rotation of the plurality of rollers 103 at a defined rotational pattern (e.g. a clockwise direction at a defined rotational speed). Rotation of the plurality of rollers 103 can be controlled by the control unit 118, via a respective drive motor associated with each roller of the plurality of rollers 103. In this regard, in some example embodiments, to de-shingle shingled items on the singulation conveyor 102, the control unit 118 can cause selective actuation of one or more drive motors of the singulation conveyor 102 to rotate the respective rollers based on the defined rotational pattern. The rotational pattern referred herein, may correspond to at least one of: a rotational speed or a time period of rotation based on which the plurality of rollers 103 can be rotated.

In accordance with some example embodiments, the plurality of rollers 103 can be configured to (a) convey the stream of items in the direction X of conveyance and (b) singulate the items by separating the items of the stream of items and creating desired or programmed gaps amongst the items.

For determining information related to shingling of the items on the singulation conveyor 102, the material handling system 100 can comprise a plurality of sensors such as, sensors 202, 204, 206, and 208 (similar to the sensors 120) that may be positioned, at a height, near the singulation conveyor 102. The one or more of the sensors 202, 204, 206, and 208 can correspond to imaging devices for example, color cameras (202-1, 204-1, 206-1, and 208-1) and/or depth cameras (202-2, 204-2, 206-2, and 208-2), respectively. In this aspect, the color cameras (202-1, 204-1, 206-1, and 208-1) of the sensors (202, 204, 206, and 208) can be configured to capture colored images of one or more sections of the singulation conveyor 102. Further, the depth cameras (202-2, 204-2, 206-2, and 208-2) can be configured to capture three-dimensional (3D) images (i.e. comprising image data in three dimensions) of the one or more sections of the singulation conveyor 102. In some example embodiments, the sensors (202, 204, 206, and 208) can correspond to one of the depth cameras or color cameras. Although, FIG. 2 illustrates, the color cameras (202-1, 204-1, 206-1, and 208-1) and/or depth cameras (202-2, 204-2, 206-2, and 208-2) to be installed over, at a height, above the singulation conveyor 102, however, without limiting a scope of the present disclosure, in some example embodiments, the color cameras (202-1, 204-1, 206-1, and 208-1) and/or depth cameras (202-2, 204-2, 206-2, and 208-2) can be installed below a roller bed of the singulation conveyor 102. In this regard, according to some examples, the cameras installed below the roller bed of the singulation conveyor 102 can facilitate in precisely detecting overlapping or shingling of the items, (for example, overlapped edges of two items that may not be visible in field of view of cameras installed at a height above the singulation conveyor 102) on the roller bed of the singulation conveyor 102. In some example embodiments, the material handling system 100 can comprise the color cameras (202-1, 204-1, 206-1, and 208-1) and/or depth cameras (202-2, 204-2, 206-2, and 208-2) installed both at a height above the singulation conveyor 102 and below the roller bed of the singulation conveyor 102.

Illustratively, the sensors (202-208) can be communicatively coupled to the control unit, and/or to the computational platform 130 via the communication network 136. To this end, in some example embodiments, the cameras (depth cameras and/or color cameras) referred herein, may be configured to provide image data (such as, but not limited to, depth information, information about a plurality of 3D points over various surfaces of shingled items, 3D points on different surfaces of the items that may be captured in a scene, information about background pixels and foreground pixels of a scene, and/or the like). In this regard, according to some example embodiments, the AI subsystem 132 and/or the control unit 118 may utilize various image processing techniques such as, but not limited to, time of flight estimation, triangulation or phase shift estimation, corner detection, edge detection, feature detection (like, but not limited to, search based edge detection techniques or zero crossing-based edge detection techniques) for identifying geometric feature points on the items. Geometric feature points referred herein, corresponds to selected 3D points in the image data representing features like edges, corners, special markings, and/or the like, on the items. Identification of such geometric feature points by the AI subsystem 132 can be utilized by the control unit 118 to determine shingling or overlapping of one or more items on the singulation conveyor 102.

In some examples, the AI subsystem 132 can be configured to provide (e.g. to the control unit 118), data comprising: information about region of interests (ROI's) 210, 212, 214, and 216 on the singulation conveyor 102. The ROI's determined by the AI subsystem 132 may correspond to a bounding box or a virtual periphery that can comprise one item or grouped items (e.g. shingled items) within the ROI. For example, the ROI 210 can comprise one item 234, the ROI 212 can comprise 6 grouped items viz. 236, 238, 240, 242, 246, and 248, the ROI 214 can comprise 3 items grouped together viz. item 248, 250, and 252, and the ROI 216 can comprise 6 grouped items viz. item 254, 256, 258, 260, 262, and 264. In some example embodiments, the control unit 118 can be configured to identify, for one or more of the ROIs (210-216), shingled items within the respective ROIs (210-216) on the singulation conveyor 102. For example, in some example embodiments, based on determination of geometric feature points for items within the ROI 214, by the AI subsystem 132, the control unit 118 can identify, an overlapping of the item 248 with the items 252 and/or the item 250.

According to some example embodiments, identification of the ROIs and geometric feature points to determine a degree of shingling of the items can be performed based on techniques as described in U.S. patent application Ser. No. 16/540,330, entitled, "Systems, Methods, and Apparatuses, For Singulating Items in a Material Handling Environment", filed 14 Aug. 2019, details of which are incorporated herein by reference.

According to some example embodiments, the conveying surface 201 of the singulation conveyor 102 can be defined by the plurality of rollers 103 that may include motor driven rollers (MDRs) or non-motor driven rollers. In some examples, the conveying surface 201 can comprise one or more sets of rollers such that each set of rollers includes rollers with different cross-sectional profiles arranged in a defined order. Said different, the conveying surface 201 can be defined by sets of rollers 265, 270, 275, and 280 that can include rollers of different roller cross-sectional profiles that can be actuated to cause de-shingling of the items (234-264) on the singulation conveyor 102. Further details of arrangement of rollers of varying roller cross-sectional profiles on the singulation conveyor 102 are described in reference to FIGS. 3-5.

Figure 3:
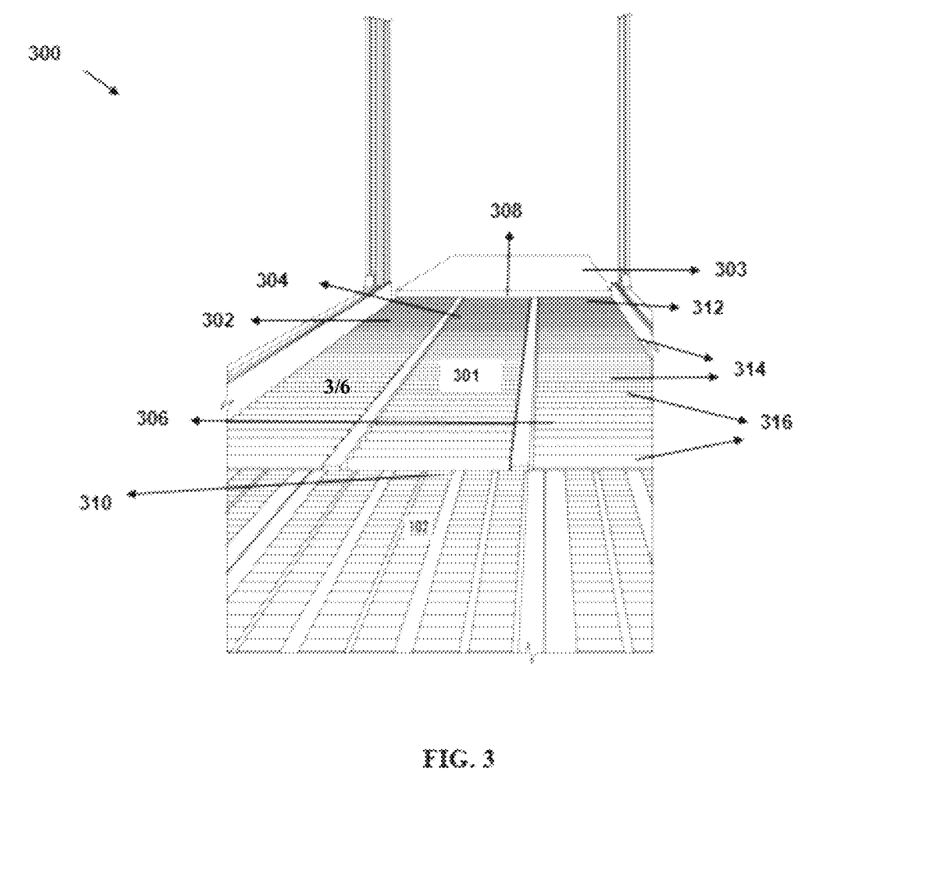
FIG. 3 illustrates a zone of the singulation conveyor comprising a plurality of rollers of different roller cross-sectional profiles arranged in a defined order, in accordance with some example embodiments described herein.

FIG. 3 illustrates a zone 300 of the singulation conveyor 102 that comprises a roller conveyor bed 301, defined by multiple sets of rollers of varying roller cross-sectional roller profile. In this regard, the roller conveyor bed 301 comprises multiple rollers of varying roller cross-sectional profiles arranged in a defined order or sets such that, each set of rollers comprises a unique arrangement of rollers having different cross-sectional profiles. In accordance with various example embodiments described herein, one or more rollers on the roller bed 301 can be configured to be selectively actuated for rotation, by the control unit 118, thereby causing de-shingling of the items that may be received on the roller conveyor bed 301 in shingled form. Illustratively, in accordance with some example embodiments, the singulation conveyor 102 can comprise a section 303 that may receive an incoming stream of items (for instance, from the ASRS 116 described in FIG. 1). In this regard, the incoming stream of items received on the section 303 can comprise multiple items that may be shingled (e.g. but not limited to, partial overlapping, horizontal overlapping, vertical overlapping, stacked, and/or the like) over each other. In some examples, the section 303 may receive a stream or mail comprising items 254, 256, 258 . . . 264 shingled in a manner as illustrated in FIG. 2.

According to some example embodiments, the section 303 can comprise one or more mechanical actuators, robotic manipulators, and/or end effectors installed along the section 303 that can be configured to separate the incoming stream of items (254, 256, 258 . . . 264) into smaller mail or group of items, that can be further received onto any of the three conveyor lanes 302, 304, and 306 defined between a first end 308 and a second end 310 of a section 305 adjacent to the section 303. To this end, in some examples, based on an item type or shape, smaller groups of items can be separated from the incoming stream of items and can be further received at the section 303. Accordingly, depending on a classification the smaller groups of items can be conveyed on any of the three conveyor lanes 302, 304, and 306. In accordance with some example embodiments, the section 305 of the singulation conveyor 102 can comprise rollers that can be configured to rotate in a manner so as to cause de-shingling of the smaller groups of items received on the respective conveyor lanes 302, 304, and 306. In this regard, in accordance with some example embodiments described herein, each of the three conveyor lanes 302, 304, and 306 can comprise multiple sets of the rollers with varying cross-sectional profile arranged in a defined order. Further, the rollers of the conveyor lanes 302, 304, and 306 that can be selectively actuated to rotate by the control unit 118 to de-shingle items from the smaller groups of shingled items.

Illustratively, the conveyor lanes 302, 304, and 306 can comprise a first set of rollers 312, a second set of rollers 314, and a third set of rollers 316, respectively defined along the roller conveyor bed 301. In some example embodiments, the conveyor lanes 302, 304, and 306 can comprise any number of sets of rollers, depending on a desired application. In accordance with some example embodiments, each set of rollers (312, 314, and 316) defining the roller conveyor bed 301 can comprise a defined arrangement of rollers based on a roller cross-sectional profile. For instance, in some example embodiments, the first set of rollers 312 can comprise an arrangement of rollers comprising, a roller of a first roller cross-sectional profile and a roller of a second roller cross-sectional profile, alternatively mounted adjacent to each other in a defined sequence. Said differently, the first set of rollers 312 can comprise multiple rollers of first roller cross-sectional profile and multiple rollers of second roller cross-sectional profiles arranged in a manner, so that first roller cross-sectional profile rollers are positioned alternatively between the multiple second roller cross-sectional profile rollers. In this regard, the first roller cross-sectional profile can correspond to a cross-sectional profile of a roller defined by a sleeve mounted around a circumference of the roller and a dowel positioned between the sleeve and the roller. Further, the second roller profile can correspond to a cross-sectional profile of a roller defining a rough cross-sectional surface of the rollers (i.e. cross-sectional surface with relatively higher friction co-efficient compared to a smooth roller cross-sectional surface).

Alternatively, in some example embodiments, the first set of rollers 314 may additionally comprise rollers of a third roller cross-sectional profile (i.e. along with rollers of the first roller cross-sectional profile and rollers of the second roller cross-sectional profile). In this regard, the third roller cross-sectional profile may correspond to a cross-sectional profile of a roller with a smooth cross-sectional surface. Similarly, in some example embodiments, the second set of rollers 314 can comprise rollers of the first cross-sectional profile arranged in a defined sequence and the third set of rollers 316 can comprise rollers of the second roller cross-sectional profile arranged in another defined sequence. Thus, in accordance with various example embodiments described herein, any arrangement or combinations of rollers of different cross-sectional profiles (smooth, rough/high friction, sleeve and dowel) can be possible. To this end, rollers of different cross-sectional profiles on the roller conveyor bed 301 can be selectively actuated for rotation, by the control unit 118, based on a degree of shingling of the shingled item and desired de-shingling of the items on the roller conveyor bed 301. Further details of arrangement of rollers of different cross-sectional profiles are described in reference to FIGS. 4-5.

Figure 4:
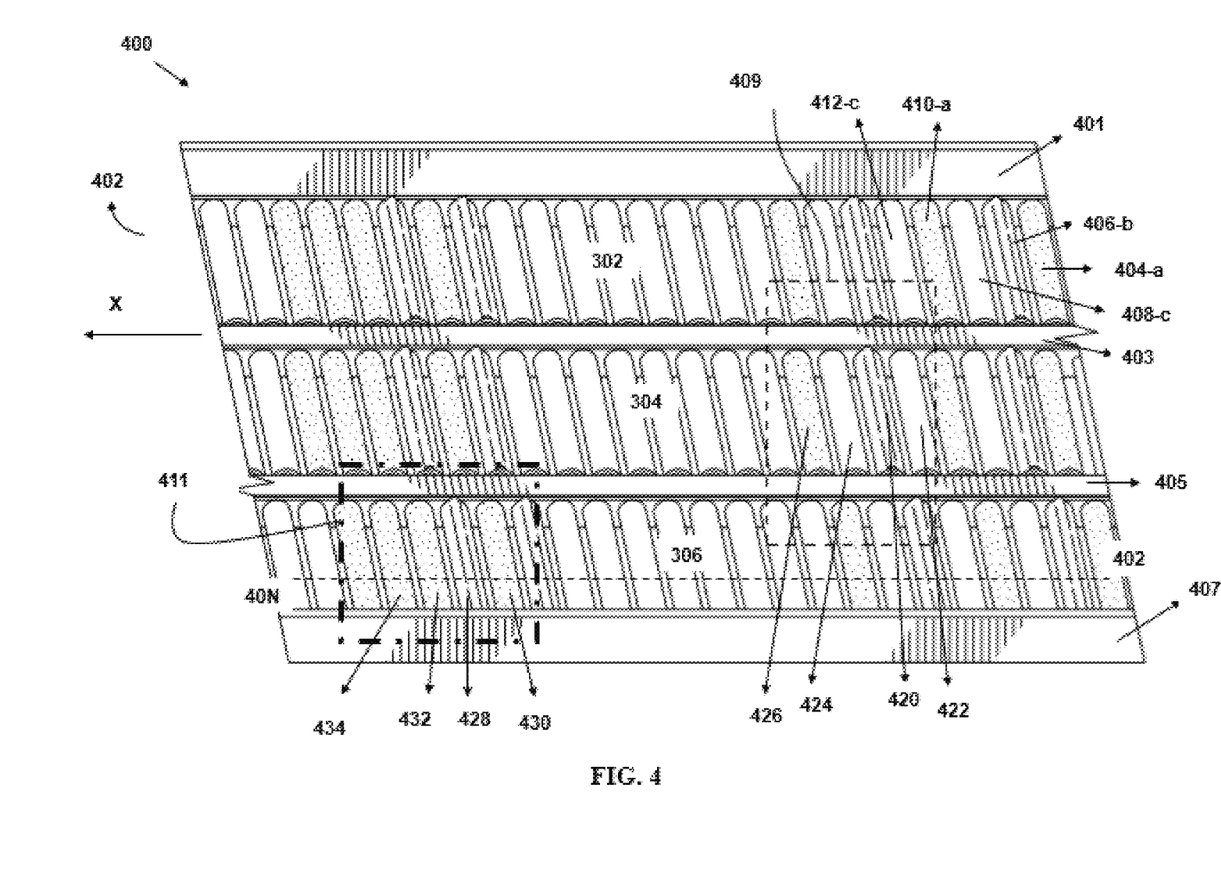
FIG. 4 illustrates a roller arrangement of a roller conveyor bed of the singulation conveyor, in accordance with some example embodiments described herein.

FIG. 4 illustrates, a section 400 of a roller conveyor bed 402 of the singulation conveyor 102 comprising a plurality of rollers having different roller cross-sectional profiles, arranged in a defined order along the roller conveyor bed 402, in accordance with some example embodiments described herein. According to some example embodiments, the roller bed 402 comprises a plurality of rollers 404-40N mounted between a first side guard 401 and a second side guard 407 of a conveyor frame of the singulation conveyor 102. Illustratively, the roller bed 402 can comprise the conveyor lanes 302, 304, and 306, as described in reference to FIG. 3. In this aspect, according to some example embodiments, each conveyor lane 302 can comprise rollers mounted between two side frames of the conveyor frame. For instance, as illustrated, rollers of the first conveyor lane 302 are mounted between the first side guard 401 and a first side frame 403 and rollers of the second conveyor lane 304 are mounted between the first side frame 403 and a second side frame 405. Similarly, rollers of the third conveyor lane 306 are mounted between the second side frame 405 and a second side guard 407 of the conveyor frame of the singulation conveyor 102.

According to some example embodiments, as described before, the roller conveyor bed 402 comprises multiple rollers of different roller cross-sectional profile that can be arranged in at least one defined order along a length of the singulation conveyor 102. For instance, the conveyor lane 302 of the roller bed 402 can comprise roller 404-*a* having a first roller cross-sectional profile, roller 406-*b* having a second roller cross-sectional profile, a roller 408-*c* having a third roller cross-sectional profile, a roller 410-*a* having the first roller cross-sectional profile, a roller 412-*c* having the third roller cross-sectional profile, and so on positioned next to each other in an order. In this regard, the first roller cross-sectional profile of the rollers 404-*a* and 410-*a* can be of a cross-sectional profile where a cross-sectional surface (e.g., an outer surface) of each roller is defined by a rough material or coating over the roller (e.g., but not limited to, a high-grip silicone coated roller and/or a polyvinyl plastic cover coated roller) so as to define a gripping surface. To this end, the rollers 404-*a* and 410-*a* can have cross-sectional surfaces that provides a gripping effect to an item passing over it. Thus, according to some example embodiments, cross-sectional surfaces of the rollers 404-*a* and 410-*a* can be defined from a material with high frictional co-efficient as compared to material defining smooth cross-sectional surfaces of the rollers 408-*c* and 412-*c*. Accordingly, the roller bed 402 can comprise arrangement of rollers with different cross-sectional profiles, for example, high grip roller (roller 404-*a*), a dowel and sleeve based roller (roller 406-*b*), a smooth profile roller (roller 408-c), another high grip roller (roller 410-a) positioned in a sequence next to each other on the conveyor frame.

According to some example embodiments, a portion 409 of the roller bed 402 can comprise four rollers (viz. a first roller 420, a second roller 422, a third roller 424, and a fourth roller 426) so that the first roller 420 is positioned between the second roller 422 and the third roller 424 and the fourth roller 426 is positioned adjacent to the third roller 424. In this regard, the first roller 420 and the third roller 424 can be of a smooth cross-sectional profile and a surface of the fourth roller 426 can be defined by a material with a higher coefficient of friction than a surface of the second roller 422 and the third roller 424 respectively. In some examples, another portion 411 of the roller bed 402 can comprise a sleeve and dowel cross-sectional profile-based roller 428 positioned between three high grip cross-sectional profile rollers 430, 432, and 434. Accordingly, different arrangements of rollers with different cross-sectional profiles (smooth, high grip, sleeve and dowel based) can be possible.

In some example embodiments, shingled items may be conveyed on the roller bed 402 in a direction X. According to various example embodiments described herein, the plurality of rollers 404-40N of the roller bed 402 can be configured to be rotated in different rotational patterns to cause singulation (or de-shingling) of shingled items on the roller bed 402. Rotational pattern referred herein, corresponds to a manner of rotation (e.g. a rotational speed) based on which the plurality of rollers 404-40N can be rotated. For instance, in some examples, the roller 406-b can be configured to be rotated based on a first rotational pattern, the roller 404-a can be configured to be rotated based on a second rotational pattern, and the roller 408-c can be rotated on a third rotational pattern. In this aspect, the first rotational pattern, the second rotational pattern, and the third rotational pattern can be different from each other. In some example embodiments, to de-shingle, shingled items on the roller bed 402, the roller 406-b can be rotated at a first rotational speed and the roller 404-a can be rotated at a second rotational speed that can be different than the first rotational speed. To this end, rotating rollers at different rotational speeds can initiate separation of overlapped portions of the shingled items. In some example embodiments, the roller 404-a can be rotated based on a first rotational speed, the roller 406-b can be rotated based on a second rotational speed, and the roller 408-c can be rotated based on a third rotational speed. Further, in accordance with various example embodiments described herein throughout the description, the plurality of rollers 404-40N can be rotated selectively based on a degree of shingling of the shingled items identified by the AI subsystem 132. For example, in some instances, the roller 404-a can be rotated based on a first rotational pattern for a first time-period and the roller 406-b can be rotated based on a second rotational pattern for a second time-period different than a first-time period to cause de-shingling of the shingled items. Further details of rotational pattern based on which the plurality of rollers 404-40N can be selectively actuated are described in FIGS. 5-6.

Figure 5:
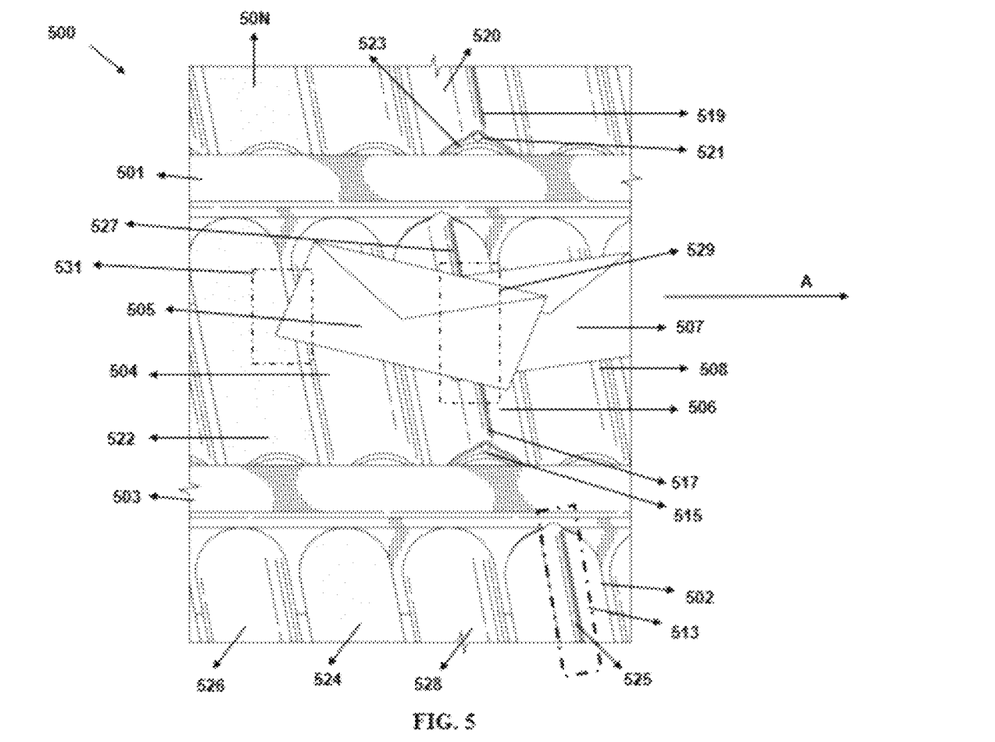
FIG. 5 illustrates an example scenario of singulation of items by a first set of rollers, in accordance with some example embodiments described herein.

FIG. 5 illustrates an example scenario of singulation of items by a set of rollers, in accordance with some example embodiments described herein. Illustratively, a section 500 of the singulation conveyor 102 can comprise a set of rollers 502, 504, 506 . . . 50N (referred hereinafter as, 502-50N) mounted between two side frames of a conveyor frame. For instance, rollers 522, 504, 506, and 508 are mounted between side frames 501 and 503 of the conveyor frame of the singulation conveyor 102. Further, according to various example embodiments, the set of rollers 502-50N can be configured to be selectively actuated for rotation, by the control unit 118, to cause de-shingling of shingled items (505 and 507).

Illustratively, the set of rollers 502-50N comprises multiple rollers, where each roller is of a defined shape (e.g. cylindrical shape roller defined between two ends of the roller) and cross-sectional profile. To this end, in accordance with some example embodiments, the set of rollers 502-50N can have rollers of different roller cross-sectional profiles. For example, a first roller 502 of the set of rollers 502-50N can be of a first roller cross-sectional profile. In this regard, the first roller cross-sectional profile defines a portion 513 that protrudes out from a cross-sectional surface of the first roller 502. To this end, the cross-sectional profile of the roller 502 is defined by a sleeve mounted around the roller 502 and at least one dowel positioned between the sleeve and circumference of the roller 502, thereby defining the portion 513. In some examples, two dowels can be positioned between the sleeve and the circumference of the roller 502 thereby defining two apex portions (or protruded portions) along a length of the roller 502. A roller 506 can also be of the first roller cross-sectional profile as of the first roller 502. Accordingly, the roller 506 can be of the first cross-sectional profile where the cross-sectional profile of the roller 506 is defined by a dowel 515 that can be mounted around a cross-sectional surface (lateral surface) of the roller 506 and a sleeve 517 mounted over the dowel 515 and the cross-sectional surface of the roller 506. Accordingly, the sleeve 517 mounted over the dowel 515 and the cross-sectional surface of the roller 506 defines an apex portion 527 (such as a protruded surface) along a length of the roller 506 between its two ends. Illustratively, the roller 520 is also of the first cross-sectional profile defined by a sleeve 521 mounted around a dowel 519 which is positioned between the sleeve 521 and a cross-sectional surface 523 of the roller 520.

In accordance with various example embodiments, the plurality of rollers (403-40N or 103) as described herein throughout the description may comprise an arrangement of rollers of different cross-sectional profile. In this regard, although, at various instances of the description, the first roller is represented as a roller of a first roller cross sectional profile (i.e. having a sleeve and a dowel). However, without limiting the scope of the disclosure, in some example embodiments, the first roller may correspond to a roller with a roller profile of the third roller cross-sectional profile (i.e. roller with a smooth cross-sectional surface). Similarly, in some example embodiments, the first roller may correspond to a roller with roller profile of the second roller cross-sectional profile (i.e. roller with a high frictional cross-sectional surface) and so on.

In accordance with some example embodiments, the section 500 of the singulation conveyor 102 can also comprise rollers of a second roller cross-sectional profile. For instance, the rollers 522, 524, and 50N can be of the second roller cross-sectional profile. The second cross-sectional profile herein, corresponds to a profile where a cross-sectional surface (e.g., an outer surface) of each roller is defined by a rough or a high friction material. To this end, rollers of the second cross-sectional profile are adapted to provide a gripping effect to hold passing (or pull back) of an item over such rollers. Further, the section 500 of the singulation conveyor 102 can also comprise rollers of a third-roller cross-sectional profile. In this regard, the third roller cross-sectional profile corresponds to a profile of a roller having a smooth cross-sectional surface of the roller. For instance, the rollers 504, 508, 526, and 528 can comprise a cross-sectional profile defined by a smooth cross-sectional surface. Thus, it can be understood that according to some example embodiments, cross-sectional surfaces of the rollers 522, 524, and 50N can be defined from a material with high frictional co-efficient as compared to material defining smooth cross-sectional surfaces of the rollers 504, 508, 526, and 528.

According to some example embodiments, as illustrated, the section 500 of the singulation conveyor 102 may receive two items (e.g. a first envelope 505 and a second envelope 507) that may be shingled together. In this regard, as illustrated, the items 505 and 507 are shingled such that, a front portion of the first envelope is overlapped over a rear portion of the second envelope. Said differently, the items 505 and 507 are overlapped partially and a shingled portion 529 (i.e. overlapping rear and front ends of the items 505 and 507) corresponds to the overlapped portion of the items 505 and 507. Illustratively, the shingled portion 529 of the items 505 and 507 is positioned over the roller 506. In accordance with some example embodiments described herein, a singulation action to be performed on the shingled items (i.e. the first envelope 505 and the second envelope 507) may be to de-shingle the shingled items (e.g. to separate the items 505 and 507 or create a desired gap between the items 505 and 507).

For de-shingling the shingled items (505 and 507), in accordance with some example embodiments, one or more rollers of the set of rollers 502-50N may be selectively actuated to rotate based on a defined rotational pattern. For instance, in an example embodiment, the roller 506 can be rotated, by the control unit 118, based on a first rotational pattern, the roller 504 can be rotated based on a second rotational pattern, and the roller 522 can be rotated based on a third rotational pattern. In this regard, in some examples, rollers 522 and 504 can be rotated in a first rotational speed and the roller 506 can be rotated in a second rotational speed to cause separation or de-shingling of the shingled items (i.e. envelopes 505 and 507).

Alternatively, and/or additionally, in some example embodiments, the rollers 522, 504, and 506 can be rotated at different rotational speeds to cause de-shingling of the shingled items (505 and 507). For example, in some embodiments, the roller 522 can be rotated at a first rotational speed and the roller 506 can be rotated at a second rotational speed different than the first rotational speed. Thus, the rollers 502-50N can be rotated selectively based on different rotational patterns (e.g. rotational speed, time period of rotation etc.) to cause de-shingling of the shingled items 505 and 507.

In accordance with various example embodiments described herein, in an example scenario, the rollers 506 and 504 can be rotated in a clockwise rotational direction to cause movement of the items 505 and 507 in a direction A. Further, the shingled portion 529 of the items 505 and 507 follows the movement in the direction A. As the shingled portion 529 passes over the first cross-sectional roller profile of the roller 506, the shingled portion 529 is uplifted due to the protrusion in the apex portion 527, thereby causing a push that tends to break the overlapping of the items 505 and 507. Also, at this instance, the roller 522 can be rotated at a different rotational speed to support de-shingling of the items 505 and 507. In this regard, the movement of the item 505 in the direction A is opposed by a frictional force generated between a rear portion 531 of the item 505 and cross-sectional surface (high grip/rough) of the roller 522. Accordingly, de-shingling of the shingled items (505 and 507) can be initiated. Further, in accordance with said example embodiments, in response to initiating of the de-shingling, desired gaps between the items 505 and 507 can be created based on rotating some rollers (e.g. rollers that may be positioned ahead of the roller 506 in the direction A) according to a rotational pattern.

By way of implementation of various example embodiments described herein, high grip rollers (e.g. the roller 522) protrudes slightly above a lowest roller plane (e.g. roller plane of the roller 504), due to its coating (i.e. coating that enables a high grip or friction). This supports engagement of the cross-sectional surface of the high grip rollers (i.e. the roller 522) with a portion of the shingled item (e.g. portion 531 of the item 505), thereby pulling it ahead while the rollers 504, 506, and another roller (similar to roller 522), either stop or run in reverse to pull the shingled items (505 and 507) apart before sending the items ahead in a direction of conveyance. Further, in this aspect, an eccentric roller (e.g. the roller 506 having the sleeve and the dowel based cross-sectional roller profile) can also perform a similar pull-stop de-shingling operation. In this regard, as the cross-sectional roller profile of the roller 506 offers a protruding portion higher above the roller plane of the rollers 504 and 522, it allows the protruding portion to engage with the shingled portion 529 of the shingled items (505 and 507) with a more irregular surface, thereby, destabilizing the shingled portion 529 of the items 505 and 507. This impact of the protruded portion of the eccentric roller on the shingled portion 529 supports to increase effectiveness of the shingling operation initiated by the rollers 522 and 504.

Figure 6:
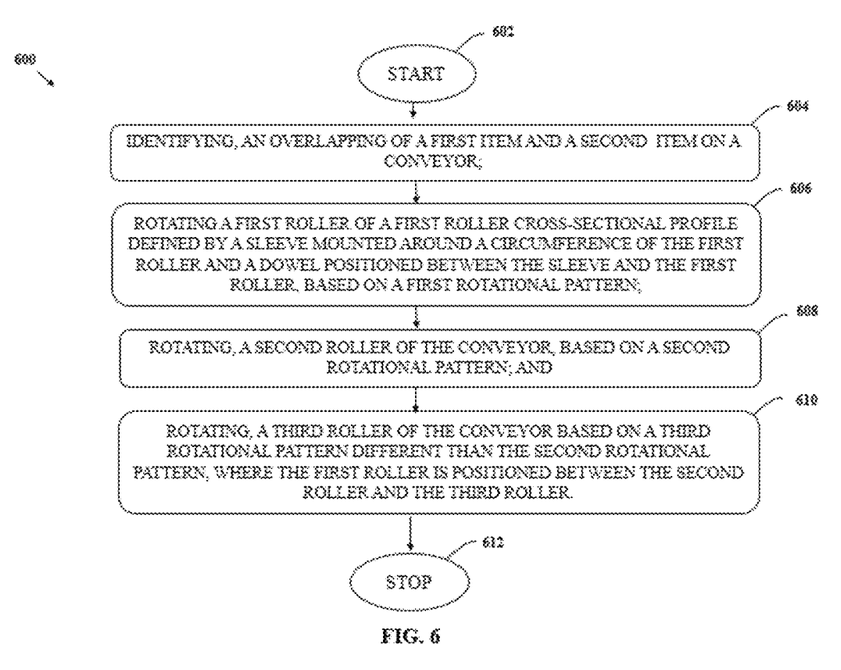
FIG. 6 illustrates an example flowchart representing a method of singulation of items, in accordance with some example embodiments described herein.

FIG. 6 illustrates, an example flowchart of the operations performed by an apparatus, such as the singulation conveyor 102 of FIGS. 1-5 respectively, in accordance with example embodiments of the present invention. It will be understood that each block of the flowcharts, and combinations of blocks in the flowchart, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIG. 6, when executed, convert a computer or processing circuitry into a particular machine configured to perform an example embodiment of the present invention. Accordingly, the operations of FIG. 6 define an algorithm for configuring a computer or processor, to perform an example embodiment. In some cases, a general-purpose computer may be provided with an instance of the processor which performs the algorithm of FIG. 6 to transform the general-purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowchart, can be implemented by special purpose hardware-based computer systems which perform the specified functions, or combinations of special purpose hardware and computer instructions.

FIG. 6 illustrates an example flowchart representing a method 600 for de-shingling of a plurality of shingled items on the singulation conveyor 102, in accordance with some example embodiments described herein. The method starts at step 602. At step 604, the singulation conveyor 102 can comprise means such as, the AI subsystem 132 to identify, an overlapping of a first item (e.g. the item 505) and a second item (e.g. the item 507) on the singulation conveyor 102. In this regard, the AI subsystem 132 can identify overlapping of the items 505 and 507, based on details as described in FIG. 2.

At step 606, the singulation conveyor 102 can comprise means such as, the control unit 118 to cause rotation of a first roller (e.g. the roller 506) of the first cross-sectional profile defined by the sleeve 517 mounted around a circumference (cross-section) of the roller 506 and the dowel 515 positioned between the sleeve 517 and the roller 506. In this regard, in some examples, the roller 506 can be rotated based on a first rotational pattern. For example, the roller 506 can be rotated at a first rotational speed. In this regard, rotation of the roller 506 causes movement of the shingled items (505 and 507) in the direction A, as illustrated in FIG. 5

Moving to step 608, the singulation conveyor 102 can comprise means such as, the control unit 118 to cause rotation of the second roller (e.g. the roller 504) based on a second rotational pattern. For example, in an embodiment, the roller 504 can be rotated a second rotational speed that can be different than the first rotational speed. At step 610, the singulation conveyor 102 can comprise means such as, the control unit 118 to cause rotation of a third roller (e.g. the roller 522) based on a third rotational pattern. For example, in an embodiment, the roller 522 can be rotated at a third rotational speed different than the first rotational speed and the second rotational speed. In accordance with various example embodiments, rotating the rollers 506, 504, and 522 at first rotational speed, second rotational speed, and third rotational speed respectively, can cause to initiate separation of the shingled items (505 and 507), in a similar manner as described in reference to FIG. 5.

It may be noted that, as used in this specification and the appended claims, the singular forms "a," "an" and "the" comprise plural referents unless the content clearly dictates otherwise.

References within the specification to "one embodiment," "an embodiment," "embodiments", or "one or more embodiments" are intended to indicate that a particular feature, structure, or characteristic described in connection with the embodiment is comprised in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

Detailed embodiments are disclosed herein; however, it is to be understood that the disclosed embodiments are merely exemplary, which may be embodied in various forms. Therefore, specific structural and functional details disclosed herein are not to be interpreted as limiting, but merely as a basis for the claims.

While it is apparent that the illustrative embodiments described herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present disclosure.

What is claimed is:

1. A singulation conveyor comprising:
   a first roller of a first roller cross-sectional profile defined by a sleeve mounted around a circumference of the first roller and a dowel positioned between the sleeve and the first roller; and
   a second roller of a second roller cross-sectional profile different from the first roller cross-sectional profile, wherein the first roller and the second roller are configured to be rotated based on a first rotation pattern and a second rotation pattern, respectively, to cause singulation of a shingled item.

2. The singulation conveyor of claim 1, wherein the first rotation pattern and the second rotation pattern correspond to at least one of: a rotational speed, based on which the first roller and the second roller is configured to be rotated.

3. The singulation conveyor of claim 1, comprising a conveyor surface defined by a plurality of rollers mounted on the conveyor frame, wherein the plurality of rollers comprises the first roller, the second roller, and a third roller of a third roller cross-sectional profile different from the first roller cross-sectional profile and the third roller cross-sectional profile.

4. The singulation conveyor of claim 3, wherein the first roller, the second roller, and the third roller are configured to be selectively rotated based on a degree of shingling of the shingled item on the singulation conveyor.

5. The singulation conveyor of claim 3, wherein the plurality of rollers comprises:
   the first roller positioned between the second roller and the third roller; and
   a fourth roller positioned adjacent to the third roller, wherein a second surface of the second roller and a fourth surface of the fourth roller comprises a higher coefficient of friction than a third surface of a third roller.

6. The singulation conveyor of claim 5, wherein the second roller is configured to rotate at a first rotational speed and the fourth roller is configured to rotate at a second rotational speed different than the first rotational speed to de-shingle the shingled item on the singulation conveyor.

7. The singulation conveyor of claim 5, wherein the second roller is configured to rotate in a first direction based on the second rotational pattern and the fourth roller is configured to rotate based on a fourth rotational pattern different than the second rotational pattern to de-shingle the shingled item on the singulation conveyor.

8. A singulation system comprising:
a singulation conveyor comprising:
  a first roller of a first roller cross-sectional profile defined by a sleeve mounted around a circumference of the first roller and a dowel positioned between the sleeve and the first roller; and
  a second roller of a second roller cross-sectional profile different from the first roller cross-sectional profile;
a control unit communicatively coupled to the singulation conveyor, the control unit configured to:
  identify a first item positioned on the singulation conveyor wherein the first item overlaps a second item;
  cause to rotate at least one of, the first roller and the second roller, based on a first rotation pattern and a second rotation pattern, respectively, to separate the first item and second item so that the first item and second item no longer overlaps with each other.

9. The singulation system of claim 8, wherein the first rotation pattern and the second rotation pattern correspond to at least one of: a rotational speed of rotation based on which the first roller and the second roller is configured to be rotated.

10. The singulation system of claim 8, further comprising:
a sensing unit communicatively coupled to the control unit, the sensing unit configured to capture an image of a zone of a singulation conveyor, wherein the control unit is configured to:
  process the captured image to identify a first feature of the first item and a second feature of the second item on the singulation conveyor; and
  identify, based on the processing, an overlapping of the first item with the second item on the singulation conveyor.

11. The singulation system of claim 8, wherein the singulation conveyor comprises a conveyor surface defined by a plurality of rollers mounted on the conveyor frame, wherein the plurality of rollers comprises the first roller, the second roller, and a third roller of a third roller cross-sectional profile different from the first roller cross-sectional profile and the third roller cross-sectional profile.

12. The singulation system of claim 11, wherein the first roller, the second roller, and the third roller are configured to be selectively caused to be rotated, by the control unit, based on a degree of overlapping of the first item with the second item on the singulation conveyor.

13. The singulation system of claim 11, wherein the plurality of rollers comprises:

the first roller positioned between the second roller and the third roller; and
a fourth roller positioned adjacent to the third roller, wherein a second surface of the second roller and a fourth surface of the fourth roller comprises a higher coefficient of friction than a third surface of a third roller.

14. The singulation system of claim 13, wherein the control unit is configured to cause:
the second roller to rotate at a first rotational speed; and
the fourth roller to rotate at a second rotational speed to initiate separation of the first item and the second item, wherein the first rotational speed is different than the second rotational speed.

15. The singulation system of claim 13, wherein the control unit is configured to cause:
the second roller to rotate based on the second rotational pattern; and
the fourth roller to rotate based on a fourth rotational pattern direction different than the second rotational pattern to initiate separation of the first item and the second item.

16. A method of de-shingling an item comprising:
identifying, an overlapping of a first item and a second item on a conveyor;
rotating a first roller of a first roller cross-sectional profile defined by a sleeve mounted around a circumference of the first roller and a dowel positioned between the sleeve and the first roller;
rotating, a second roller of the conveyor, based on a second rotational pattern; and
rotating, a third roller of the conveyor based on a third rotational pattern different than the second rotational pattern, wherein the first roller is positioned between the second roller and the third roller.

17. The method of claim 16, wherein the second rotational pattern and the third rotational pattern corresponds to at least one of: a rotational speed of rotation, based on which the first roller and the second roller is configured to be rotated.

18. The method of claim 16, wherein a second surface of the second roller comprises a higher friction co-efficient that the third surface of the third roller.

19. The method of claim 18, comprising:
rotating the second roller at a second rotational speed; and
rotating the third roller at a third rotational speed different than the second rotational speed to initiate separation of the first item and the second item.

20. The method of claim 18, comprising:
rotating the second roller based on a second rotational pattern; and
rotating the third roller based on a third rotational pattern different than the second rotational pattern to initiate separation of the second item and the first item.

* * * * *